US011600278B2

(12) United States Patent
Khamis et al.

(10) Patent No.: US 11,600,278 B2
(45) Date of Patent: Mar. 7, 2023

(54) CONTEXT-AWARE SIGNAL CONDITIONING FOR VEHICLE EXTERIOR VOICE ASSISTANT

(71) Applicant: GM Global Technology Operations LLC, Detroit, MI (US)

(72) Inventors: Alaa M. Khamis, Courtice (CA); Gaurav Talwar, Novi, MI (US); Romeo D. Garcia, Jr., Waterford, MI (US); Carmine F. D'agostino, Canton, MI (US); Neeraj R. Gautama, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 17/234,221

(22) Filed: Apr. 19, 2021

(65) Prior Publication Data

US 2022/0335934 A1 Oct. 20, 2022

(51) Int. Cl.
| | | |
|---|---|---|
| *G10L 15/22* | (2006.01) | |
| *G10L 21/02* | (2013.01) | |
| *H04R 3/00* | (2006.01) | |
| *G10L 21/0208* | (2013.01) | |
| *G10L 21/0272* | (2013.01) | |

(52) U.S. Cl.
CPC .............. *G10L 15/22* (2013.01); *G10L 21/02* (2013.01); *H04R 3/005* (2013.01); *G10L 2015/225* (2013.01); *H04R 2499/13* (2013.01)

(58) Field of Classification Search
CPC ......... G10L 15/22; G10L 15/20; G10L 21/02; G10L 21/0208; G10L 21/0216; G10L 21/0232; G10L 21/32; G10L 2015/225; G10L 25/78; H04R 3/005; H04R 3/12; H04R 2499/13; B60R 16/0373; G06F 3/167
USPC ....... 704/231, 233, 235, 238, 243, 245, 246, 704/250, 251, 225; 381/302, 71.4, 86, 381/61, 66, 100–110
See application file for complete search history.

(56) References Cited

U.S. PATENT DOCUMENTS

| | | | |
|---|---|---|---|
| 10,803,687 B1 | 10/2020 | Khamis et al. | |
| 2007/0038436 A1* | 2/2007 | Cristo | ................... G10L 15/22 704/E15.04 |

(Continued)

FOREIGN PATENT DOCUMENTS

WO WO-2019081198 A1 * 5/2019 ........... B60R 25/245

OTHER PUBLICATIONS

Habets, Emanuel A. P. "Single- and Multi-Microphone Speech Dereverberation using Spectral Enhancement", Ph.D. Thesis, Technische Universiteit, Jun. 25, 2007, pp. 1-258.

(Continued)

*Primary Examiner* — Leshui Zhang
(74) *Attorney, Agent, or Firm* — Cantor Colburn LLP (57) ABSTRACT

A vehicle includes a plurality of microphones to obtain speech from a person outside the vehicle as an input signal and a sensor system to determine a location and orientation of the person relative to the vehicle. The vehicle also includes a controller to determine characteristics of the input signal and to determine whether to perform speech enhancement on the input signal based on one or more of the characteristics and the location and orientation of the person.

20 Claims, 4 Drawing Sheets

(56) References Cited

U.S. PATENT DOCUMENTS

2008/0162120 A1\* 7/2008 Mactavish .............. G10L 21/06
   381/370
2017/0249939 A1\* 8/2017 Brooks ............... H04M 1/6008

OTHER PUBLICATIONS

Nakatani et al., "Jointly optimal denoising, dereverberatio, and source separation", IEEE/ACM Trans. Audio, Speech, and Language Processing on Feb. 12, 2020, pp. 1-16.

Ondusko et al., "Blind Signal-to-Noise Ratio Estimation of Speech Based on Vector Quantizer Classifiers and Decision Level Fusion", Journal of Signal Process Systems, 2017, pp. 335-345.

Taha et al., "A Survey on Techniques for Enhancing Speech", International Journal of Computer Applications, vol. 179, No. 17, Feb. 2018, pp. 1-15.

Wilson et al., "Speech Denoising Using Nonnegative Matrix Factorization with Priors", IEEE International Conference on Audio and Speech Signal Processing, Apr. 2008, pp. 1-4.

\* cited by examiner

CONTEXT-AWARE SIGNAL CONDITIONING FOR VEHICLE EXTERIOR VOICE ASSISTANT

INTRODUCTION

The subject disclosure relates to context-aware signal conditioning for a vehicle exterior voice assistant.

Vehicles (e.g., automobiles, trucks, construction equipment, farm equipment, automated factory equipment, shuttle buses) increasingly facilitate interaction between an operator and the vehicle, including audible interaction. An exterior voice assistant refers to a system with microphones and speakers on an exterior of a vehicle. The exterior voice assistant facilitates verbal communication between the vehicle and a person outside the vehicle. The exterior voice assistant may enable reactive assistance, proactive assistance, and social interaction. Reactive assistance refers to the exterior voice assistant responding to a query such as "open liftgate." Proactive assistance refers to the exterior voice assistant providing anticipatory alerts or recommendations such as "you left a pet in the vehicle." Social interaction refers to a welcome or farewell greeting, for example. Background noise and reverberation may degrade the quality of the voice signal. The position, orientation, and speaking volume of the person may also affect the voice signal. Accordingly, it is desirable to provide context-aware signal conditioning for the vehicle exterior voice assistant.

SUMMARY

In one exemplary embodiment, a vehicle includes a plurality of microphones to obtain speech from a person outside the vehicle as an input signal and a sensor system to determine a location and orientation of the person relative to the vehicle. The vehicle also includes a controller to determine characteristics of the input signal and to determine whether to perform speech enhancement on the input signal based on one or more of the characteristics and the location and orientation of the person.

In addition to one or more of the features described herein, the sensor system includes an array of ultrawideband (UWB) or Bluetooth Low Energy (BLE) detectors.

In addition to one or more of the features described herein, each of the array of UWB or BLE detectors communicates with a device in possession of the person to determine the location of the person relative to the vehicle and a level of the input signal at each of the plurality of microphones at different locations of the vehicle is used to determine the orientation of the person relative to the vehicle.

In addition to one or more of the features described herein, the controller determines whether to instruct the person to take an action to improve a quality of the input signal.

In addition to one or more of the features described herein, the controller instructs the person to move closer to one of the plurality of microphones or to change the orientation to face the one of the plurality of microphones.

In addition to one or more of the features described herein, the controller determines whether to instruct the person to speak more loudly based on a volume detected at one of the plurality of microphones to which the person is closest.

In addition to one or more of the features described herein, the controller determines whether to perform the speech enhancement on the input signal based on fuzzy logic, on Bayesian probability, on Dempster-Shafer evidential decision-making, or on statistical machine learning.

In addition to one or more of the features described herein, the controller performs the speech enhancement by performing denoising.

In addition to one or more of the features described herein, the controller performs the speech enhancement by performing de-reverberation.

In addition to one or more of the features described herein, the controller performs the speech enhancement by performing a combination of denoising, de-reverberation, and source separation.

In another exemplary embodiment, a method in a vehicle includes arranging a plurality of microphones to obtain speech from a person outside the vehicle as an input signal and arranging a sensor system to determine a location and orientation of the person relative to the vehicle. The method also includes configuring a controller to determine characteristics of the input signal and to determine whether to perform speech enhancement on the input signal based on one or more of the characteristics and the location and orientation of the person.

In addition to one or more of the features described herein, the arranging the sensor system includes arranging an array of ultrawideband (UWB) or Bluetooth Low Energy (BLE) detectors.

In addition to one or more of the features described herein, the method also includes configuring each of the array of UWB or BLE detectors to communicate with a device in possession of the person to determine the location of the person relative to the vehicle and determining the orientation of the person relative to the vehicle based on a level of the input signal at each of the plurality of microphones at different locations of the vehicle.

In addition to one or more of the features described herein, the configuring the controller includes configuring the controller to determine whether to instruct the person to take an action to improve a quality of the input signal.

In addition to one or more of the features described herein, the configuring the controller includes configuring the controller to instruct the person to move closer to one of the plurality of microphones or to change the orientation to face the one of the plurality of microphones.

In addition to one or more of the features described herein, the configuring the controller includes configuring the controller to determine whether to instruct the person to speak more loudly based on a volume detected at one of the plurality of microphones to which the person is closest.

In addition to one or more of the features described herein, the configuring the controller includes configuring the controller to determine whether to perform the speech enhancement on the input signal based on fuzzy logic, on Bayesian probability, on Dempster-Shafer evidential decision-making, or on statistical machine learning.

In addition to one or more of the features described herein, the configuring the controller includes configuring the controller to perform the speech enhancement by performing denoising.

In addition to one or more of the features described herein, the configuring the controller includes configuring the controller to perform the speech enhancement by performing de-reverberation.

In addition to one or more of the features described herein, the configuring the controller includes configuring the controller to perform the speech enhancement by performing a combination of denoising, de-reverberation, and source separation.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

As previously noted, an exterior voice assistant facilitates verbal interaction between a person outside a vehicle and the vehicle. The accuracy with which a person is assisted may rely in large part on how accurately the person is understood. Embodiments of the systems and methods detailed herein relate to context-aware signal conditioning for a vehicle exterior voice assistant. Speech enhancement may be performed on the input signal from the person. Under some situations, speech enhancement techniques may degrade the quality of the input signal rather than improve it. In those cases, signal improvement may still be attained through guidance to the person speaking to adjust distance, orientation, or volume. As detailed, the current scenario (i.e., context) is identified in order to determine the proper approach to improving the input signal quality.

Figure 1:
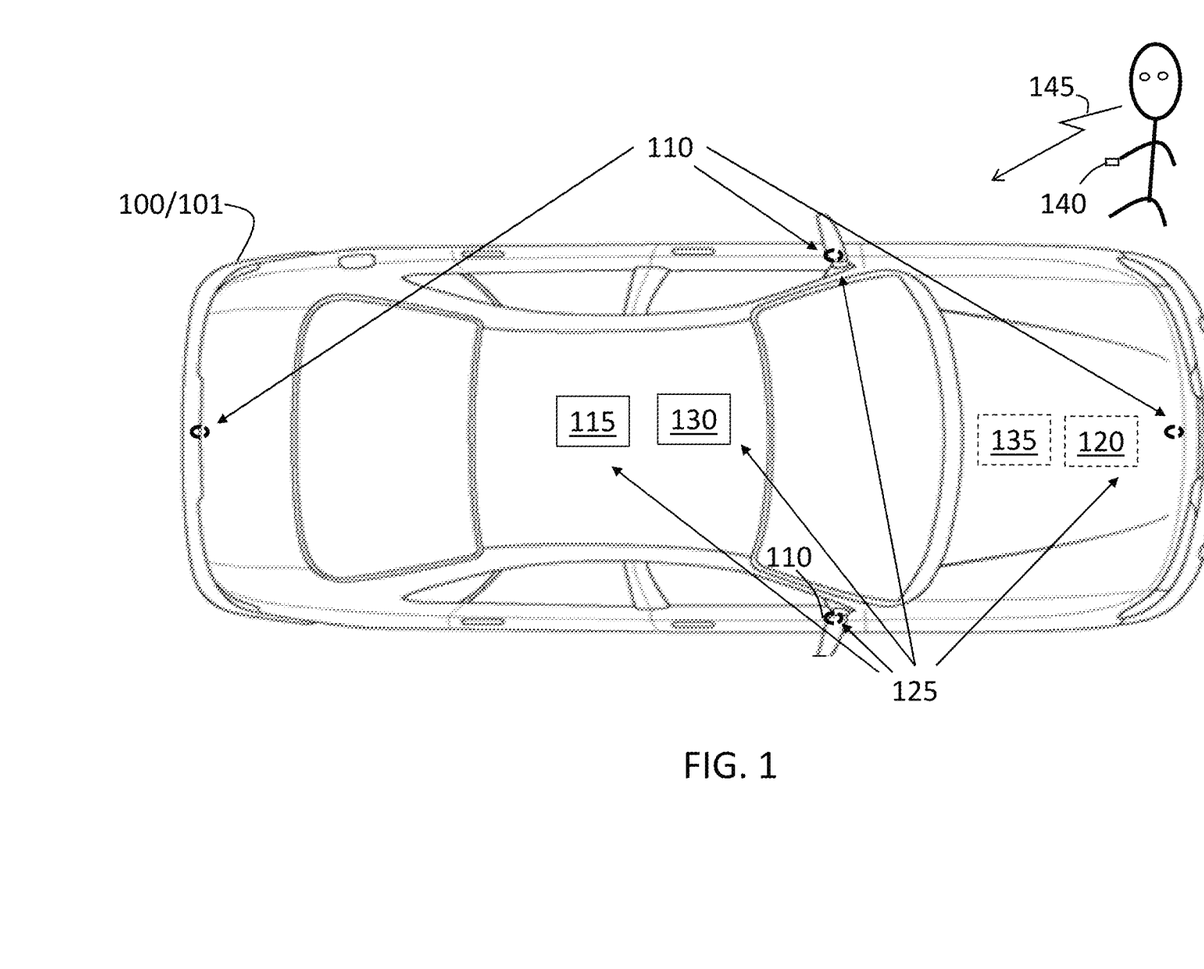
FIG. 1 shows a vehicle that implements context-aware signal conditioning for a vehicle exterior voice assistant according to one or more embodiments.

In accordance with an exemplary embodiment, FIG. 1 shows a vehicle 100 that implements context-aware signal conditioning for a vehicle exterior voice assistant 125. The exemplary vehicle 100 shown in FIG. 1 is an automobile 101. The vehicle 100 is shown with four external microphones 110 (i.e., microphones arranged to obtain audio from outside the vehicle 100) located at each side of the vehicle 100. In alternate embodiments, the numbers and locations of the microphones 110 are not limited by the exemplary illustration. According to exemplary embodiments, the microphones 110 may be digital array microphones, for example, the vehicle 100 is also shown with a speaker 115. In alternate embodiments, any number of speakers 115 may be arranged around the vehicle 100 and may, for example, be co-located with the microphones 110. The vehicle 100 is also shown with a controller 120. The controller 120 may use information from one or more external sensors 130 (e.g., radar system, lidar system, camera) and/or one or more vehicle sensors 135 (e.g., inertial measurement unit (IMU), steering angle detector, accelerometer) to control an aspect of operation of the vehicle 100. For example, semi-autonomous operation (e.g., collision avoidance, adaptive cruise control) may be controlled by the controller 120.

The controller 120 may be part of the vehicle exterior voice assistant 125, along with the microphones 110 and speaker 115. The controller 120 may implement aspects of signal improvement for the vehicle exterior voice assistant 125, as detailed in FIG. 2. The controller may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Some of the external sensors 130 may also be considered part of the vehicle exterior voice assistant 125. For example, the external sensors 130 may include an ultrawideband (UWB) detector 305 (FIG. 3) or a Bluetooth low energy (BLE) detector. These or other known external sensors 130 can detect a distance to a person using the exterior voice assistant 125 based on a device 140 (e.g., keyfob, smartphone) carried by the person. The device 140 may also identify the person as a speaker authorized to communicate with the exterior voice assistant 125. That is, an input signal 145 may be obtained and processed, as detailed with reference to FIG. 2, only when the input signal 145 is a voice associated with the person carrying the device 140. Other authorization mechanisms (e.g., voice biometric-based authorization by the exterior voice assistant) may be used alternatively and are not a part of the signal improvement procedure detailed herein. The processes discussed with reference to FIG. 2 assume that an authorized speaker provides the input signal 145.

When multiple external sensors 130 (e.g., an array of UWB or BLE detectors 305 arranged around the vehicle 100) are used, the location of the person (i.e., device 140) relative to the vehicle 100 may be determined in addition to the distance. Otherwise, the array of microphones 110 may be used to determine location and orientation of the person with the device 140. The determination of distance, location, and orientation may be implemented according to a number of known techniques and is further discussed with reference to FIG. 3.

Figure 2:
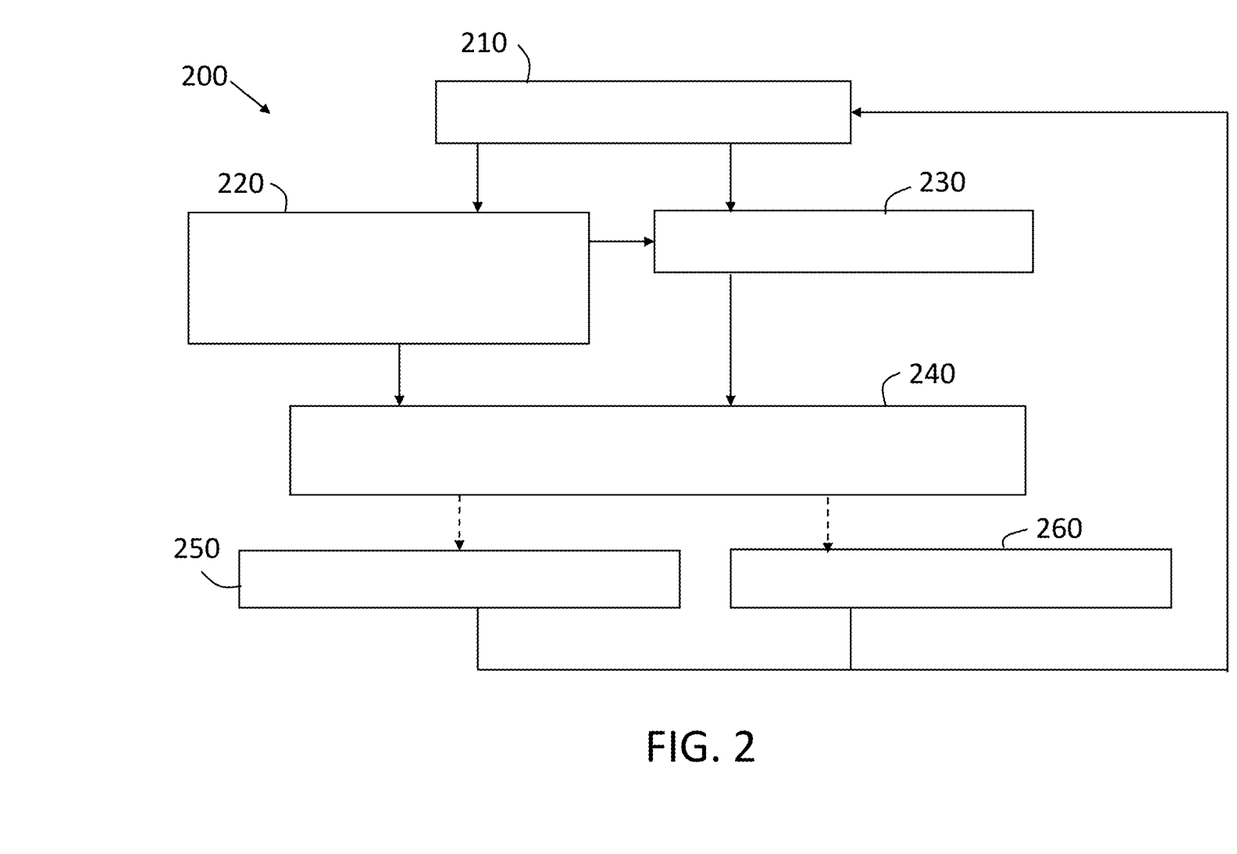
FIG. 2 is a process flow of a method of performing context-aware signal conditioning for a vehicle exterior voice assistant according to one or more embodiments.

FIG. 2 is a process flow of a method 200 of performing context-aware signal conditioning for a vehicle exterior voice assistant 125 according to one or more embodiments. The processes of the method 200 may be performed following the detection of a device 140 and/or other processes to identify an authorized speaker. As indicated, the method 200 is performed iteratively while a voice input signal 145 is provided to the vehicle exterior voice assistant 125 by an authorized speaker. At block 210, obtaining a voice input signal 145 may use one or more of the microphones 110 external to the vehicle 100 as shown in FIG. 1, for example. As previously noted, obtaining the input signal 145 may include identifying the voice as being that of an authorized user (e.g., person with the proper device 140 such as a keyfob or smartphone) prior to the processes at block 210.

At block 220, the processes include obtaining the location and orientation of the source of the input signal 145 (i.e., the authorized speaker). The location may be determined prior to the processes at block 210 as part of the process of identifying the authorized speaker. That is, for example, the device 140 may be detected to trigger the authorization process. The location of the device 140 and, thus, the authorized speaker may be determined as part of this detection. Determining location and orientation of the person providing the input signal 145 (i.e., the authorized speaker)

may involve an array of UWB and/or BLE detectors 305, as further discussed with reference to FIG. 3, or may involve the microphones 110, a combination of the microphones 110 and UWB and/or BLE detectors 305, or another known approach.

For example, an array of UWB and/or BLE detectors 305 may be among the external sensors 130 of the vehicle 100. A time of flight for a signal from each UWB or BLE detector 305 to the device 140 held by the authorized speaker and back may be used to determine the distance between each UWB or BLE detector 305 of the array and the speaker. The relative distances to each of the UWB or BLE detectors 305, in view of the location of each UWB or BLE detector 305 of the vehicle 100, may then be used (e.g., by the controller 120) to determine a location of the authorized speaker relative to the vehicle 100 using a geometric approach. The relative volume level measured at each of the microphones 110 may be used to determine orientation. The volume may be determined according to EQ. 4, as discussed herein. Alternately, cameras may be among the external sensors 130 and image processing may be performed to determine an orientation of the authorized speaker relative to the vehicle 100.

At block 230, characterizing the input signal 145 refers to obtaining several signal quality measures or, additionally or alternatively, to obtaining a standard estimate of speech quality using a standardized methodology (e.g., P.563). As indicated, the location and orientation of the authorized speaker (obtained at block 220) may be used to characterize the input signal at block 230. For example, characterizing may include obtaining signal-to-noise ratio (SNR). According to an exemplary approach, noise may be estimated based on estimating and updating the background noise spectrum during pauses in the speech of the authorized speaker when the input signal 145 is not being provided. SNR may be calculated as the ratio of the power of the input signal 145 to the power of the background noise. Characterizing, at block 230, may also include obtaining source-to-artifacts ratio (SAR) as follows:

$$SAR = 10\log_{10}\frac{\|s_{target} + e_{interf} + e_{noise}\|^2}{\|e_{artif}\|^2} \quad [\text{EQ. 1}]$$

Obtaining SAR according to EQ. 1 is a beamforming process in which $S_{target}$ is the allowed deformation of the input signal, $e_{interf}$ is the allowed deformation of sources other than the authorized speaker, $e_{noise}$ is the allowed deformation of perturbating noise, and $e_{artif}$ may correspond to artifacts of the beamforming algorithm such as musical noise, for example, or to deformations induced by the beamforming algorithm that are not allowed. Another exemplary characteristic includes source-to-distortion ratio (SDR) given by:

$$SDR = 10\log_{10}\frac{\|s_{target}\|^2}{\|e_{interf} + e_{noise} + e_{artif}\|^2} \quad [\text{EQ. 2}]$$

The SDR reflects the difference between the input signal from the authorized speaker and the estimated signal in the mean-square sense. Yet another exemplary characteristic is source-to-interference ratio (SIR) given by:

$$SIR = 10\log_{10}\frac{\|s_{target}\|^2}{\|e_{interf}\|^2} \quad [\text{EQ. 3}]$$

The SIR determines the ratio of energies of the input signal from the authorized speaker and the interference in the separated signal. Volume of the authorized speaker may be determined based on sound pressure level (SPL) given by:

$$L_p = 20\log_{10}\left(\frac{p}{p_0}\right) \quad [\text{EQ. 4}]$$

In EQ. 4, p is the root mean square sound pressure, $p_0$ is the reference sound pressure (e.g., reference sound pressure in air 20 micro Pascals), and SPL is in decibels (dB).

At block 240, determining whether the authorized speaker can take action to improve the input signal and/or determining whether speech enhancement will help may both be done, in turn, and in either order. The order in which the determination is made may be based on a condition rather than always being the same. For example, if the signal strength of the input signal 145 is below a threshold value, then according to an exemplary embodiment, a determination of whether the authorized speaker can take action to improve the input signal 145 may be made first. Determining whether the authorized speaker can take action to improve the input signal 145 refers to determining whether to instruct the authorized speaker to take that action. This determination is detailed with reference to FIG. 3.

According to an exemplary embodiment, a determination of whether speech enhancement will help may be made after it is determined that the authorized speaker cannot improve the input signal 145. This determination uses the characterization (at block 230) and may be based on implementing fuzzy logic, a probabilistic approach such as Bayesian probability, a Dempster-Shafer evidential decision-making approach, a statistical machine learning approach, or any other decision-making algorithm. The exemplary case of using fuzzy logic is further detailed with reference to FIG. 4. A result of this determination is either that speech enhancement should not be undertaken (i.e., it will not help) or that speech enhancement should be undertaken (i.e., it will help). In the later case, the type of speech enhancement, among known speech enhancement techniques, that should be undertaken (at block 260) may also be determined.

Providing guidance to the authorized speaker, at block 250, is based on determining (at block 240) that the authorized speaker can take action to improve the input signal 145. This is further discussed with reference to FIG. 3. Performing speech enhancement, at block 260, is based on determining (at block 240) that speech enhancement should be performed. As previously noted, the determination that speech enhancement should be performed may include a determination of what the speech enhancement should include. For example, speech enhancement may include known techniques such as denoising, de-reverberating, or jointly performing denoising, de-reverberation, and source separation.

Denoising refers to the process of reducing or removing the noise from the acoustic signals. Known denoising algorithms with different levels of complexity and efficiency include ideal channel selection or ideal binary mask, spectral subtractive, subspace, noise estimation and statistical-based methods. De-reverberation refers to addressing reverberation, which is multipath propagation of an acoustic signal from its source to a microphone 110. If the authorized speaker is too close to a microphone 110, the resulting reverberation is minimal and traditional de-reverberation techniques address noise. If the authorized speaker is too far from the microphone 110, the result may be severe distortions including high levels of noise and reverberation. De-reverberation may be implemented using known acoustic echo cancellation (AEC) or known de-reverberation suppression techniques. Source separation refers to recovering an original speech signal from a convolutive mixture of speech signals. The known blind source separation (BSS) technique estimates an original signal through observed signals. Blind signal separation (i.e., blind beamforming), like BSS, exploits statistical characteristics (from block 230).

Figure 3:
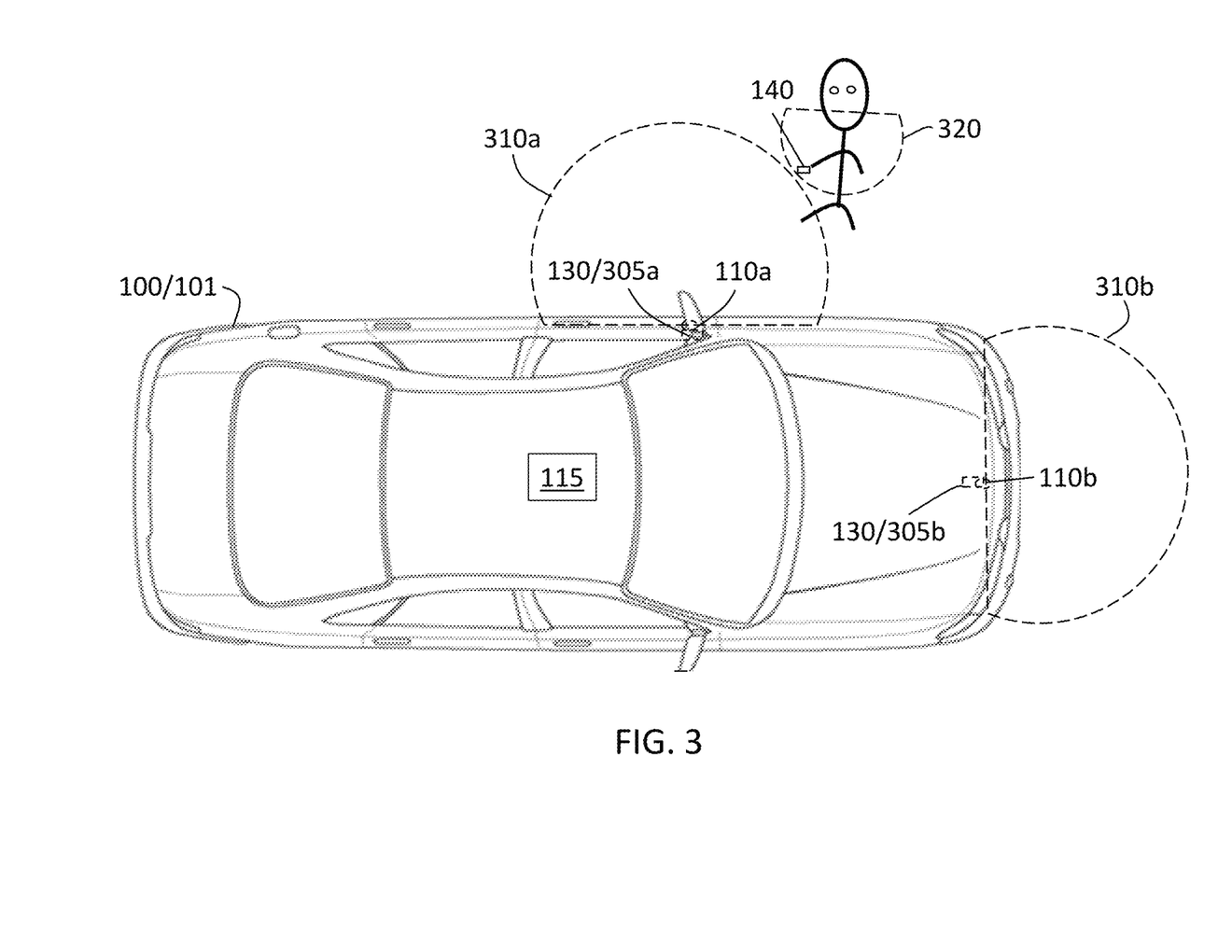
FIG. 3 illustrates a determination, as part of the method of FIG. 2, of whether a person can take action to improve the input signal according to an exemplary embodiment.

FIG. 3 illustrates a determination, at block 240 (FIG. 2), of whether an authorized speaker can take action to improve the input signal according to an exemplary embodiment. Continuing reference is made to FIGS. 1 and 2. Two microphones 110a, 110b (generally referred to as 110) are shown in locations of the vehicle 100 corresponding with locations of two UWB or BLE detectors 305a, 305b (generally referred to as 305). A region 310a is shown to correspond with the microphone 110a and a region 310b is shown to correspond with the microphone 110b. Generally, each microphone 110 may have a corresponding region 310. A speaking zone 320 is indicated for the authorized speaker who is shown carrying the device 140. The speaking zone 320 may be a range of angles of orientation and a distance that originate at the orientation determined for the speaker (at block 220).

Ideally, the speaking zone 320 may be fully within a region 310 associated with one of the microphones 110. This would account for location and orientation. Then, determining whether volume should be increased by the authorized speaker is a straight-forward determination based on the SPL measured at the microphone 110 whose corresponding region 310 the speaker is within. Based on the location and orientation determined for the authorized speaker (at block 220), the controller 120 may determine whether the speaking zone 320 of the authorized speaker is within the region 310 of any microphone 110. If the speaking zone 320 is not within a region 310 of any microphone 110, then the determination, at block 240, may be that the authorized speaker can take action to improve the input signal 145.

Then, at block 250, audio guidance may be provided by an audio speaker 115 on or within the vehicle 100. The specific guidance may be based on proximity of the authorized speaker to a microphone 110 and of the speaking zone 320 with a particular region 310. That is, if the authorized speaker is at a distance greater than a threshold distance from any microphone 110, the guidance may be for the authorized speaker to move closer to one particular microphone 110. If the distance is within the threshold distance but the speaking zone 320 is not within a region 310 of the closest microphone 110 to the authorized speaker, then the guidance may be for the authorized speaker to change their orientation toward the closest microphone 110 In the exemplary case shown in FIG. 3, the speaker may be asked to move closer to the driver-side mirror and to turn to face the mirror where the microphone 110a is located so that the speaking zone 320 is within the region 310a corresponding with the microphone 110a.

Figure 4:
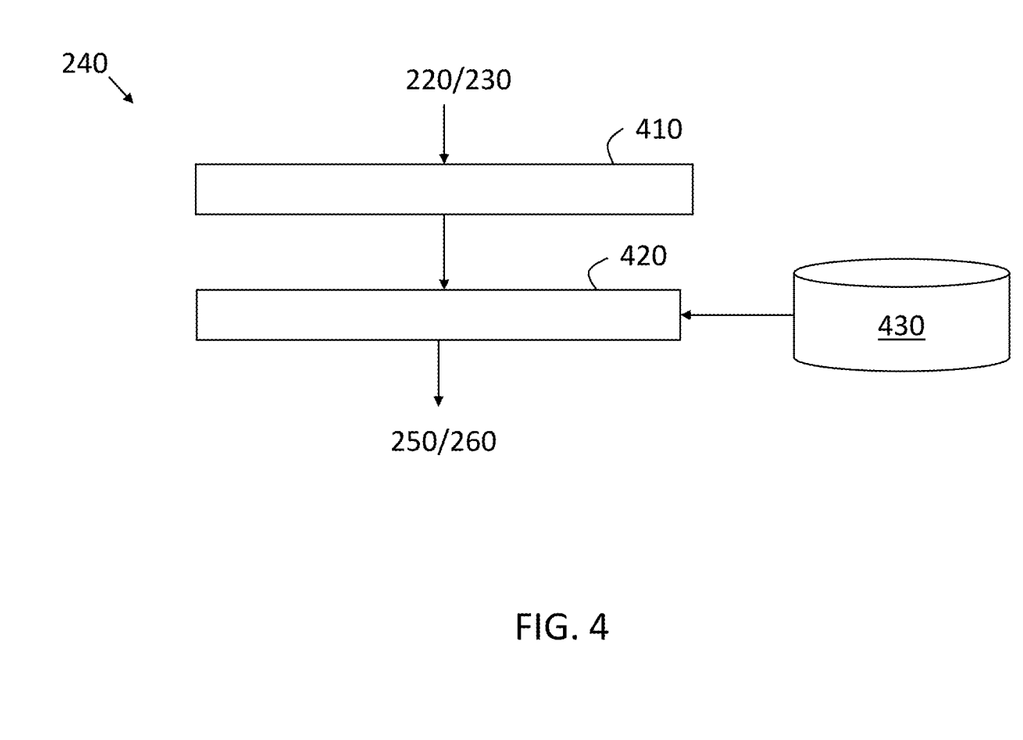
FIG. 4 is a process flow of a determination, as part of the method of FIG. 2, of whether speech enhancement will improve the input signal according to an exemplary embodiment.

FIG. 4 is a process flow of a determination, at block 240 of the method 200 of FIG. 2, of whether speech enhancement will improve the input signal 145 according to an exemplary embodiment. The exemplary approach shown in FIG. 4 is fuzzy logic. As previously noted, other exemplary embodiments for performing the determination at block 240 may use a Bayesian probability, a Dempster-Shafer evidential decision-making approach, a statistical machine learning approach, or any other decision-making algorithm. At block 410, generating linguistic variables from the characteristics generated at block 230 may also be referred to as fuzzification. In fuzzy logic, fuzzification refers to converting a crisp quantity into a fuzzy quantity. That is, characteristics of the input signal (obtained at block 230) such as SNR, SAR, and SDL are converted from values estimated according to formulas, such as EQS. 1-4, into fuzzy quantities (e.g., low, medium, high).

The mapping of the estimates received from block 230 to fuzzy quantities may be based on established ranges or rules. For example, each linguistic variable derived from each characteristic may be expressed as a quintuple (x, T(x), G, S). The variable name is x and T(x) is the set of linguistic values that the variable with the name x may have. U is the universe of discourse, and G is a syntactic rule that generates the terms in T(x). S is a semantic rule that associates each linguistic value with its meaning (i.e., a fuzzy set defined on U). The set of linguistic values associated with the variable estimated SNR may be {very low, low, medium, high, very high}, for example.

At block 420, implementing an inference mechanism relies on a rules database 430. The rules database 430 may include a rule for every combination of every linguistic value of every variable. For example, there may be only two characterizing variables from block 230, SNR and noise source identification (NSI). SNR may be associated with five linguistic values {very low, low, medium, high, very high} corresponding to levels of SNR values, and NSI may also be associated with five linguistic values {high static, static, normal, non-static, very non-static} corresponding with types of NSI. In this exemplary case, the rules database 430 would include twenty-five rules associated with the twenty-five combinations of linguistic values for SNR and NSI. For example, one rule among the twenty-five may correspond to an SNR of "very low" and an NSI of "normal" while another rule corresponds to an SNR of "high" and an NSI of "static."

The rule applied at block 420 may be based on the combination of linguistic values corresponding with the characteristics received from block 230, as well as from block 220 (e.g., distance, orientation). The rule results in the output of a decision from block 240. As discussed with reference to FIG. 2, the decision may be to provide guidance to the speaker (at block 250), to perform speech enhancement (at block 260) and, according to alternate embodiments, to specify which speech enhancements to perform (e.g., denoising, de-reverberation).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:
a plurality of microphones configured to obtain speech from a person outside the vehicle as an input signal;

a sensor system configured to determine a location and an orientation of the person relative to the vehicle, wherein the orientation of the person is determined using a volume level measured at each of the plurality of microphones, wherein the volume level is calculated bsed on a root mean square sound pressure and a reference sound pressure; and a controller configured to determine characteristics of the input signal and to determine whether to perform speech enhancement on the input signal based on one or more of the characteristics and the location and the orientation of the person.

2. The vehicle according to claim 1, wherein the sensor system includes an array of ultrawideband (UWB) or Bluetooth Low Energy (BLE) detectors.

3. The vehicle according to claim 2, wherein each of the UWB or BLE detectors of the array of UWB or BLE detectors is configured to communicate with a device in possession of the person to determine the location of the person relative to the vehicle and a level of the input signal at each of the plurality of microphones at different locations of the vehicle is used to determine, by the controller, the orientation of the person relative to the vehicle.

4. The vehicle according to claim 1, wherein the controller is further configured to determine whether to instruct the person to take an action to improve a quality of the input signal.

5. The vehicle according to claim 4, wherein the controller is configured to instruct the person to move closer to one of the plurality of microphones or to change the orientation to face the one of the plurality of microphones.

6. The vehicle according to claim 1, wherein the controller is configured to determine whether to instruct the person to speak more loudly based on the volume level detected at one of the plurality of microphones to which the person is closest.

7. The vehicle according to claim 1, wherein the controller is configured to determine whether to perform the speech enhancement on the input signal based on fuzzy logic, on Bayesian probability, on Dempster-Shafer evidential decision-making, or on statistical machine learning.

8. The vehicle according to claim 1, wherein the controller is configured to perform the speech enhancement by performing denoising.

9. The vehicle according to claim 1, wherein the controller is configured to perform the speech enhancement by performing de-reverberation.

10. The vehicle according to claim 1, wherein the controller is configured to perform the speech enhancement by performing a combination of denoising, de-reverberation, and source separation.

11. A method in a vehicle, comprising:
arranging a plurality of microphones to obtain speech from a person outside the vehicle as an input signal;
arranging a sensor system to determine a location and an orientation of the person relative to the vehicle; and
configuring a controller to determine characteristics of the input signal and to determine whether to perform speech enhancement on the input signal based on one or more of the characteristics and the location and the orientation of the person,
wherein the characteristics of the input signal comprise a signal-to-noise ration (SNR), a source-to-artefacts ratio (SAR), a source-to-distortion ration (SDR), and a source-to-interference ration (SIR).

12. The method according to claim 11, wherein the arranging the sensor system includes arranging an array of ultrawideband (UWB) or Bluetooth Low Energy (BLE) detectors.

13. The method according to claim 12, further comprising configuring each of the UWB or BLE detectors of the array of UWB or BLE detectors to communicate with a device in possession of the person to determine the location of the person relative to the vehicle and determining, by the controller, the orientation of the person relative to the vehicle based on a level of the input signal at each of the plurality of microphones at different locations of the vehicle.

14. The method according to claim 11, wherein the configuring the controller includes configuring the controller to determine whether to instruct the person to take an action to improve a quality of the input signal, and wherein the configuring the controller includes configuring the controller to instruct the person to move closer to one of the plurality of microphones or to change the orientation to face the one of the plurality of microphones.

15. The method according to claim 11, wherein the configuring the controller includes configuring the controller to determine whether to instruct the person to speak more loudly based on a volume detected at one of the plurality of microphones to which the person is closest.

16. The method according to claim 11, wherein the configuring the controller includes configuring the controller to determine whether to perform the speech enhancement on the input signal based on fuzzy logic, on Bayesian probability, on Dempster-Shafer evidential decision-making, or on statistical machine learning.

17. The method according to claim 11, wherein the configuring the controller includes configuring the controller to perform the speech enhancement by performing denoising.

18. The method according to claim 11, wherein the configuring the controller includes configuring the controller to perform the speech enhancement by performing de-reverberation.

19. The method according to claim 11, wherein the configuring the controller includes configuring the controller to perform the speech enhancement by performing a combination of denoising, de-reverberation, and source separation.

20. The method according to claim 11, wherein the SAR is determined using the following equation:

$$SAR = 10\log_{10}\frac{\|s_{target} + e_{interf} + e_{noise}\|^2}{\|e_{artif}\|^2},$$

wherein the SDR is determined using the following equation:

$$SDR = 10\log_{10}\frac{\|z_{target}\|^2}{\|e_{interf} + e_{noise} + e_{artif}\|^2}, \text{ and}$$

wherein the SPL is determined using the following equation:

$$SIR = 10\log_{10}\frac{\|z_{target}\|^2}{\|e_{interf}\|^2},$$

where $S_{target}$ is an allowed deformation of the input signal, $e_{interf}$ is an allowed deformation of sources other than an authorized speaker, $e_{noise}$ is an allowed deformation of perturbating noise, and $e_{artif}$ corresponds to artefacts of a beamforming.

\* \* \* \* \*